United States Patent [19]
Margraff

[11] 3,839,235
[45] Oct. 1, 1974

[54] POLYOXETANES WITH FUNCTIONAL GROUPS

[75] Inventor: Rodolphe Margraff, Ris-Orangis, France

[73] Assignee: Rhone-Poulenc S.A.,, Paris, France

[22] Filed: July 24, 1972

[21] Appl. No.: 274,753

[30] Foreign Application Priority Data
July 26, 1971 France .............................. 71.27271

[52] U.S. Cl..... 260/2 XA, 117/161 R, 117/161 UN, 210/500, 210/507, 260/2.1 R
[51] Int. Cl. ........................ C08g 33/00, C08g 33/02
[58] Field of Search ....................... 260/2 XA, 2.1 R

[56] References Cited
UNITED STATES PATENTS
3,288,727  11/1966  Richart .............................. 260/2 X
3,459,687  8/1969  Bufton .............................. 260/2 X

*Primary Examiner*—Wilbert J. Briggs, Sr.
*Attorney, Agent, or Firm*—Stevens, Davis, Miller & Mosher

[57] ABSTRACT

Polyoxetanes are provided which comprise recurring units of the formulae:

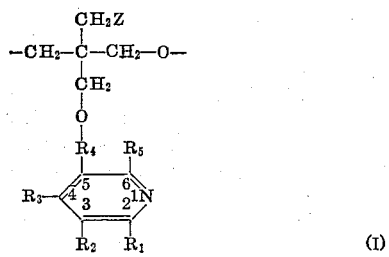

and/or

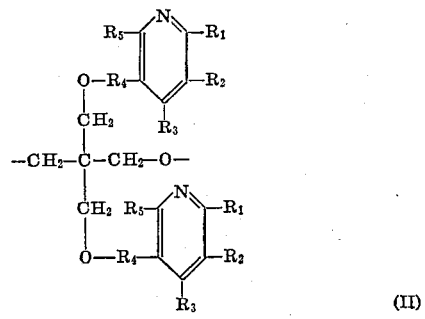

(II)

in which: each of $R_1$, $R_2$ and $R_3$, which may be identical or different, represents a hydrogen atom or a lower alkyl radical, or $R_1$ and $R_2$ together form a buteno bridge, Z represents a halogen atom or a hydroxyl, alkoxy, aryloxy, acyloxy or nitrile group, $R_5$ represents a hydrogen atom or a lower alkyl radical, and $-O-R_4$ represents $-O-$, or, together with $R_5$, forms the trivalent radical of the formula:

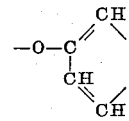

in which the free valencies of the end carbon atoms are connected to the 5 and 6 positions of the pyridine nucleus, the chain oxygen atom of each recurring unit being attached to the chain methylene group of the adjacent recurring unit, optionally, recurring units of the formula:

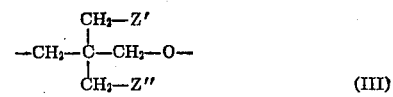

(III)

in which each of $Z'$ and $Z''$, which may be identical or different, are as defined under Z or, together, represent a single oxygen atom. The polyoxetanes can also be quaternised, thus comprising recurring units of the formulae:

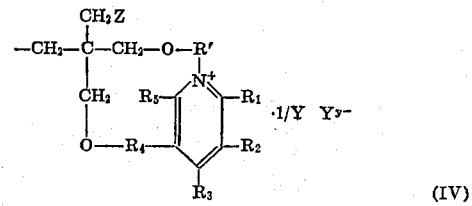

(IV)

and/or

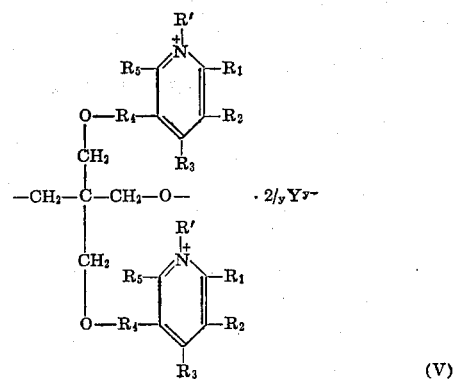

(V)

in which $R_1$, $R_2$, $R_3$, $R_4$ and $R_5$ are as defined above and, optionally, recurring units of formulae (I) and/or (II) and/or, (III), $R''$ represents a monovalent or polyvalent organic radical, and $Y^{y-}$ denotes an anion such that $H_yY$ represents water or an inorganic or organic acid, $y$ being a positive integer representing the valency of the ion Y, which polyoxetanes can be formed into membranes having useful ion-exchange properties.

15 Claims, No Drawings

POLYOXETANES WITH FUNCTIONAL GROUPS

The present invention relates to new polyethers with functional groups.

In U.S. Pat. No. 3,459,687, there are described ion exchange resins in the form of a powder or of granules, obtained from poly-3,3-bis-(chloromethyl)-oxetane (denoted hereafter by PBCMO) by reaction with amine. It is an object of the present invention to provide homogeneous membranes and, in particular, ion exchange membranes from polyoxetanes such as PBCMO. It has been found that this can be achieved with polyoxetanes possessing functional groups of a new type; these polyoxetanes can be nonquaternised or quaternised.

The non-quaternised polyoxetanes according to the present invention comprise recurring units of the formula:

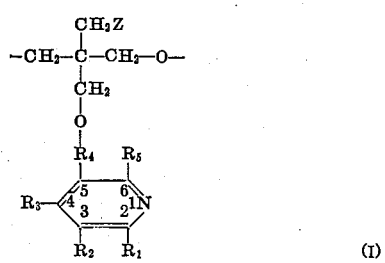

(I)

and/or

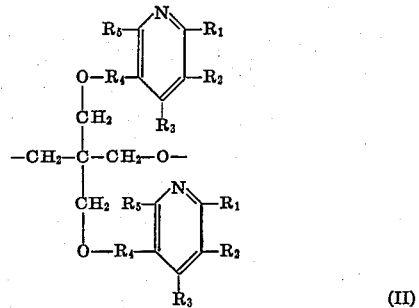

(II)

and, optionally, units of the formula:

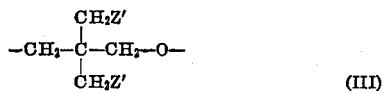

(III)

in which each of $R_1$, $R_2$ and $R_3$, which may be identical or different, represents a hydrogen atom or a lower alkyl radical, it being also possible for $R_1$ and $R_2$ together to form a buteno bridge (thus forming a quinoline nucleus with the pyridine ring), each of Z, Z' and Z'', which may be identical or different, represents one of various monovalent atoms or radicals such as halogen atoms, especially chlorine, or hydroxyl, alkoxy, aryloxy, acyloxy or nitrile groups, it being also possible for Z' and Z'' together to be a single atom of oxygen i.e. a free oxetane ring is formed, $R_5$ represents a hydrogen atom or a lower alkyl radical, and -O-$R_4$ represents the divalent oxygen atom -O-, or, together with $R_5$, forms the trivalent radical of the formula:

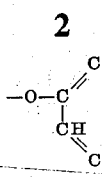

in which the free valencies of the end carbon atoms are respectively connected as follows: one to carbon atom 5 of the pyridine nucleus and the other to carbon atom 6 of the said nucleus.

The radicals Z, Z' and Z'' preferably have at most six carbon atoms if they do not contain an aromatic ring, and at most 12 if they do contain an aromatic ring. In general terms, "lower alkyl" denotes an alkyl radical with, at most, six carbon atoms.

In the non-quaternised polyoxetanes according to this invention, the proportion of nitrogen-containing heterocyclic structures per recurring ether unit (that is to say, per oxygen atom of the basic skeleton) is on average between 10 and 200 percent, and preferably between 20 and 100 percent.

The present invention provides quaternised polyoxetanes, derived from the polyoxetanes defined above and which comprise recurring units of the formula:

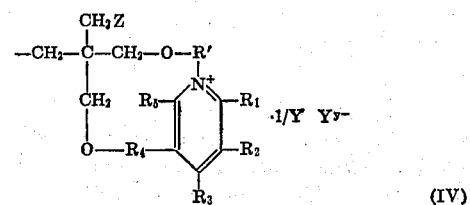

(IV)

and/or

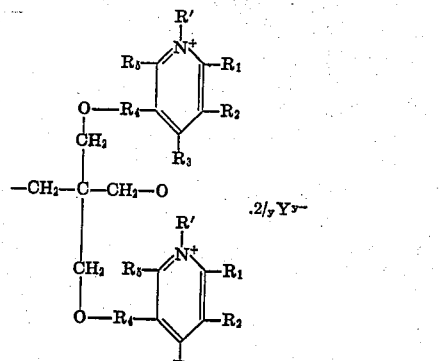

(V)

optionally combined with units of formulae I and/or II and/or III in which, $R_1$, $R_2$, $R_3$, $R_4$ and $R_5$ are as defined above, R' represents a monovalent or polyvalent organic radical, $Y^{u-}$ denotes an anion such that $Hy^u$ represents water or an inorganic or organic acid, and $y$ is a positive integer representing the charge on the ion Y.

The nature of the anion $Y^{u-}$ is not critical to this invention. Furthermore, the anion $Y^{u-}$ can be changed by the usual methods of ion exchange, especially during the use of the polyoxetanes according to the invention, without in any way fundamentally changing the nature and the properties of the quaternised polyoxetanes. Usually $Y^{u-}$ represents a halide, hydroxyl, nitrate, sulphate, phosphate or arylsulphonate, carbonate, alkylcarboxylate or aralkylcarboxylate anion.

In the quaternised polyoxetanes according to the invention the degree of quaternisation, that is to say the percentage (by number) of nitrogen-containing heterocyclic structures in the quaternised state, is generally greater than 70 percent and preferably greater than 90 percent.

The degree of cross-linking, or the percentage (by number) of quaternised nitrogen atoms bonded to another quaternised nitrogen atom by an R' radical is, in the case of membranes, preferably between 10 and 60 percent.

It should be made clear that the linking-up of the units defined above occurs between the chain oxygen atom with a free valency of one recurring unit and the methylene group with a free valency of an adjacent unit.

The non-quaternised polyoxetanes of this invention can be prepared by, in a first stage, reacting PBCMO with the N-oxide of a hydroxyamine of the pyridine type, in the form of a phenate, followed, in a second stage, by reducing the N-oxide polymer produced in this way; the quaternised polyoxetanes of this invention can be prepared by quaternising the non-quaternised polyoxetanes.

The PBCMO which can be used to prepare the polyoxetanes of this invention is a well-known product which is available commercially; its molecular weight is between 20,000 and 1,000,000, preferably between 50,000 and 300,000.

The hydroxyamines of the pyridine type which can be used are essentially those in which the hydroxyl group is carried by an aromatic nucleus of the pyridine type, i.e., contains a pyridine ring and the N-oxide group of which does not possess any tautomeric form of the pyridone type; examples of such hydroxyamines include 3-hydroxy-pyridine, 3-hydroxy-quinoline, 6-hydroxy-quinoline, 7-hydroxy-quinoline, the 3-hydroxy-picolines and the 3-hydroxy-lutidines.

The conversion of these pyridine hydroxyamines into their N-oxide can be carried out by any known means for the preparation of N-oxides, for example by the processes described by E. OCHAI, Aromatic Amine Oxides, edited by Elsevier Publications 1967; these processes consist essentially of oxidations with peroxide compounds, usually hydrogen peroxide and/or organic peracids.

The phenate form of the pyridine hydroxyamine N-oxides can be prepared according to the usual methods for the preparation of phenates, principally by the reaction of the pyridine hydroxyamine with an alkaline reagent such as an alkali metal hydroxide or alcoholate, especially sodium or potassium hydroxide or alcoholate; the reaction is generally carried out in solution or suspension in an organic solvent, more particularly in a polar solvent such as an alcohol or hexamethylphosphotriamide; the amount of alkaline reagent used is preferably between 0.9 and 1 times the stoichiometric requirement.

The reaction between PBCMO and the phenate form of the pyridine hydroxyamine N-oxide is generally carried out in an aprotic polar solvent, the PBCMO being dissolved and the phenate being dissolved or suspended; the concentration of PBCMO in the reaction medium is preferably between 1 and 10 percent by weight; the amount of phenate employed is generally between one and three times the amount of amine groups which it is desired to introduce into the polyoxetane. As the aprotic polar solvent which can be used, there may be mentioned principally dimethylsulphoxide, hexamethylphosphotriamide (HMPT), sulpholane, N-methylpyrrolidone, dimethylformamide, dimethylacetamide and tetramethylurea. The temperature of the reaction between PBCMO and the phenate form of the N-oxide is generally between 100° and 200°C., the solvent and the pressure for the reaction being so chosen that the reaction takes place in the liquid phase at the selected temperature.

The reduction of the intermediate N-oxide polymer can be carried out by the action of a reducing agent for N-oxides with a solution of the N-oxide polymer in an organic solvent, the concentration of the N-oxide polymer generally being between 0.1 percent and the limit of solubility of the polymer in the chosen solvent. Suitable solvents include tetrahydrofurane alcohols, lower carboxylic acids and chlorinated hydrocarbons. Reducing agents for N-oxides which are capable of being used in this reaction are given in the work by E. OCHAI mentioned above; there may be mentioned, more particularly, sulphur dioxide as well as molecular hydrogen in the presence of catalysts, or nascent hydrogen produced, for example, by the reaction of a metal with an acid; the amount and the duration of the reaction of these reducing agents should be chosen so as to reduce all the N-oxide groups present.

The preparation of polyoxetanes possessing units of formulae I, II and III with $Z = Z' = Z'' = Cl$ can be carried out according to the process described above, starting from PBCMO; the preparation of polyoxetanes in which Z, Z' and Z'' are, at least partially, other than Cl, can be carried out starting from PBCMO which has been modified by replacing the chlorine atoms by other substituents: this replacement can be carried out by reacting PBCMO with a compound of formula ZM, Z'M or Z''M, or with a mixture of these compounds, M being an alkali metal, dissolved in an aprotic polar solvent; the preparation of polyoxetanes possessing

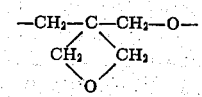

units can be carried out, for example, by reacting an alkali metal hydroxide in alcoholic solution with a polyoxetane possessing

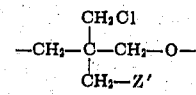

units, Z' being an acyloxy radical.

The preparation of quaternised polyoxetanes from non-quaternised polyoxetanes can usually be carried out by simply bringing the latter polyoxetane into contact with a compound of the formula $R'_rX_n$ in which R' is as defined above, X is such that $H_rX$ represents an inorganic acid, $x$ is equal to the valency of X (1 or 2), and $n$ is equal to the valency of R'. If $n$ is equal to 1, $R'_rX_n$ is a monoquaternising agent and bringing these reagents into contact gives rise to a simple quaternisation; if $n$ is equal to 2, $R'_rX_n$ is a polyquaternising agent and bringing these reagents into contact gives rise to a cross-linking quaternisation.

As monoquaternising agents of formula $R'_xX$, esters of inorganic acids are principally used, preferably alkyl, cycloalkyl or aralkyl halides and sulphates. The monoquaternising agents in which the radical R' is an alkyl, cycloalkyl or aralkyl radical containing at most 14 carbon atoms are particularly suitable. There may, especially, be mentioned methyl, ethyl, propyl, benzyl and cyclohexyl chlorides, bromides and iodides, and dimethyl or diethyl sulphates. Halogen derivatives containing other chemical groups are also suitable, such as, for example, chloroacetaldehyde, bromoketaldehyde and para-nitro-(chloromethyl)-benzene.

The polyquaternising agents of formula $R'_xX_n$ which can be used are principally polyhalogenated derivatives of alkanes, cycloalkanes or arylalkanes, especially alkylene, cycloalkylene or arylalkylene dihalides; di-(halomethyl)-oxetanes; and polyhalogenated polymers. Typical such agents include 1,3-dichloro-propane, 1,3-dibromo-propane, 1,4-dichloro-butane, 1,4-dibromo-butane, 1,4-diiodo-butane, 1,4-dichloro-but-2-ene, the bis-(chloromethyl)-benzenes, the bis-(chloromethyl)-toluenes, the bis-(chloromethyl)-xylenes, the bis-(bromomethyl)-benzenes, the bis-(bromomethyl)-toluenes and the bis-(bromomethyl-xylenes.

These simple or cross-linking quaternisations can be carried out in the usual manner, for example by the internal method (the non-quaternised polyoxetane and the quaternising agent are mixed first) or by the external method (the solid polymer is immersed in a solution of the quaternising agent). The quaternisation temperature is generally between 5° and 100°C., preferably between 20° and 70°C.

It is also possible to carry out a simple quaternisation and a cross-linking quaternisation either simultaneously or successively. The degree of cross-linking produced by the cross-linking quaternisation allows the mechanical properties and the permeation selectivity properties of the polyoxetanes of this invention to be varied; the degree of quaternisation allows the ion exchange properties and the electrical resistance properties of the polyoxetanes of this invention to be varied.

After quaternisation, the polyoxetane according to the invention contains units of formula IV and/or V; the anions $Y^-$ can be replaced by other anions $Y^-$ by simple ion exchange according to the usual techniques.

The polyoxetanes of this invention can be used as anion exchangers of the weak base type (non-quaternised polyoxetanes) or of the strong base type (quaternised polyoxetanes). They can be formed into membranes, the cross-linked membranes being produced by cross-linking a film obtained by casting a non-cross-linked form. These membranes can be reinforced with a support or screen-reinforcement such as a woven fabric, a grid or a net, this support generally forming less than 70 percent by weight, and preferably less than 40 percent, of the supported membrane. These membranes can be used in numerous fractionation processes, and, in particular, in electrodialysis, direct or inverse osmosis and dialysis; they can also be used as separators in electrical cells, in particular in electrolytic cells.

The membranes of this invention shown an excellent uniformity of properties and of distribution of ionic sites; this uniformity arises essentially from the possibility of dissolving the non-cross-linked, weak base (non-quaternised) and strong base (quaternised) forms of the polyoxetanes of the invention (and then of casting this solution).

The membranes according to the invention also show good mechanical properties; the membranes based on quaternised polyoxetanes, in particular, also show a low electrical resistance.

The following Examples further illustrate the present invention.

EXAMPLE 1

4.5 g. of 3-hydroxy-pyridine N-oxide are added to 20 cm³ of a 2 M solution of potassium methylate in methanol; the solution is evaporated to dryness, 50 cm³ of anhydrous hexamethylphosphotriamide (HMPT) are added and the mixture is heated to 140°C, in an atmosphere of dry nitrogen; a solution prepared from 200 cm³ of HMPT and 15.5 g. of poly-3,3-bis-(chloromethyl)-oxetane (PBCMO) of average molecular weight equal to 190,000 is then added. The mixture is heated, whilst stirring, in an atmosphere of dry nitrogen, for 4 hours at 140°C.

The reaction mixture is then run into 4 litres of water, the precipitate is washed with water and then with methanol and redissolved in 3 litres of tetrahydrofurane (THF). This new solution is filtered, concentrated and run into 4 litres of 0.1 N aqueous HCl; the new precipitate obtained is washed with water and then with methanol and dried.

16 g. of polyoxetane N-oxide containing 2.3 percent by weight of nitrogen are thus obtained, which corresponds to a replacement of about 14.5 percent (by number) of the chlorine atoms by hydroxy-pyridine N-oxide. It shows IR absorption bands characteristic of N-oxides (545 cm$^{-1}$ and 670 cm$^{-1}$).

This polyoxetane is dissolved in 200 cm³ of dioxane and is then reduced by passing in a gaseous stream of $SO_2$ at the rate of 2 l/hr over a period of 4 hours. The reduced polymer precipitates during the reduction; it is filtered off, washed with boiling water and then with methanol, and dried. 16 g. of polyoxetane possessing pyridine groups are thus obtained; the compound no longer shows the IR absorption bands of the N-oxides.

1.6 g. of this polyoxetane are dissolved at 100°C. in 12 cm³ of formic acid and the solution is cast on a 100 cm² glass plate and then dried for 4 days at 20°C; the film obtained is detached by immersing the film-plate assembly for 8 hours at 90°C. in 10 N potassium hydroxide solution; the film is then washed with methanol and crosslinked by immersion for 48 hours at 20°C. in a solution of 0.4 g. of para-bis-(chloromethyl)-benzene in 50 cm³ of methanol.

After washing with methanol, the quaternisation is terminated by immersing the cross-linked membrane for 24 hours at 20°C. in a solution of 2 cm³ of $CH_3I$ in 50 cm³ of methanol.

The membrane produced in this way has a substitution resistance of 3Ωcm² and a permeation selectivity of 73 percent (measurements carried out as described in French Pat. No. 1,584,187).

EXAMPLE 2

9 g. of 3-hydroxy-pyridine N-oxide are added to 40 cm³ of a 2 M solution of potassium methylate in methanol; the solution is evaporated to dryness, 50 cm³ of anhydrous hexamethylphosphotriamide (HMPT) are added and the mixture is heated to 135°C. in an atmosphere of dry nitrogen; a solution prepared from 200 cm³ of HMPT and 15.6 g. of poly-3,3-bis-(chloromethyl)-oxetane (PBCMO) of average molecular weight equal to 190,000 is then added. The mixture is heated, whilst stirring, in an atmosphere of dry nitrogen, for 7 hours at 140°C.

The reaction mixture is then run into 4 litres of water; the precipitate is washed with water and then with methanol and redissolved in 2 litres of boiling methylene chloride containing active charcoal powder. This new solution is filtered when hot, concentrated, and run into 1 litre of ethyl ether. The new precipitate obtained is washed with water and then with methanol, and dried.

19.5 g. of polyoxetane N-oxide containing 4.4 percent by weight of nitrogen are obtained, which corresponds to a replacement of about 31.8 percent of the original chlorine atoms. It shows the IR absorption bands characteristic of N-oxides.

5 g. of this polyoxetane N-oxide are dissolved in 250 cm³ of boiling acetic acid. 3 g. of iron powder are added and the solution is kept at the boil for 8 hours, filtered when hot, and precipitated by adding water; the precipitate is washed with water, dried and redissolved in methylene chlorine; the solution is filtered and the solid reprecipitated in petroleum ether and dried.

The polyoxetane with pyridine groups produced in this way is insoluble in methanol and does not show any IR absorption bands corresponding to N-oxides. When immersed in a solution of 2 g. of methyl iodide in 50 cm³ of methanol, a limpid solution is obtained. By adding ethyl ether to this solution, a light yellow powder is precipitated which is soluble in water and consists of polyoxetane containing methyl-pyridine groups.

EXAMPLE 3

5 g. of intermediate N-oxide polymer, prepared as in Example 2, are dissolved in 250 cm³ of acetic acid boiling under reflux. 25 cm³ of water and 3 g. of iron powder are added, and heating under reflux is maintained for 1 hour; a further 3 g. of iron are then added, and heating is continued for 1 hour; a further 3 g. of iron are again added, and heating is continued for 1 hour for a third time. The reaction medium is evaporated in vacuo; the residue is washed with water and then with methanol, dissolved in methylene chloride, reprecipitated in petroleum ether, dissolved in a 10 N solution of hydrochloric acid in methanol and precipitated by neutralisation with sodium hydroxide.

3 g. of a white powder consisting of a polyoxetane containing tertiary amine groups are obtained. 2 g. of this polymer are dissolved in 20 cm³ of cyclohexanone at 140°C; the solution is cast at 40°C on a 100 cm² glass plate; the assembly is dried for 15 hours at 20°C. followed by 1 hour at 125°C., and then it is immersed for 30 hours in a solution of 0.7 g. of para-bis-(chloromethyl)-benzene in 50 cm³ of methanol maintained at 20°C; the film becomes detached and the quaternisation is terminated by adding 2 cm³ of methyl iodide and leaving the mixture to react for 10 hours.

The membrane produced in this way is washed successively with methanol, water, aqueous normal hydrochloric acid at 90°C. (1 hour), water, aqueous normal sodium hydroxide solution at 90°C. (1 hour) and water.

A flexible, transparent membrane which possesses a good tensile strength is obtained. Its substitution resistance is 5Ωcm² and it has a permeation selectivity of 87 percent.

I claim:

1. Polyoxetanes which comprise recurring units of the formulae:

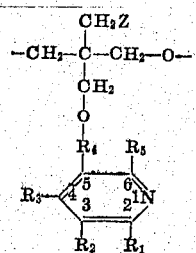

(I)

or

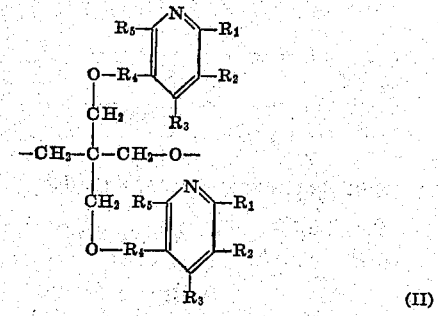

(II)

or of formulae (I) and (II) in which: each of $R_1$, $R_2$ and $R_3$, which may be identical or different, represents a hydrogen atom or a lower alkyl radical, or $R_1$ and $R_2$ together form a buteno bridge, Z represents a halogen atom or a hydroxyl, alkoxy, aryloxy, acyloxy or nitrile group, $R_5$ represents a hydrogen atom or a lower alkyl radical, and $-O-R_4$ represents $-O-$, or, together with $R_5$, forms the trivalent radical of the formula:

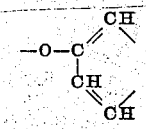

in which the free valencies of the end carbon atoms are connected to the 5 and 6 positions of the pyridine nucleus, the chain oxygen atom of each recurring unit being attached to the chain methylene group of the adjacent recurring unit.

2. Polyoxetanes according to claim 1 which also comprise recurring units of the formula:

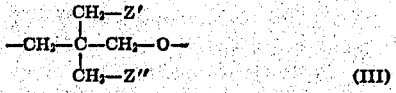

(III)

in which each of $Z'$ and $Z''$, which may be identical or different, are as defined under Z in claim 1 or, together, represent a single oxygen atom.

3. Polyoxetanes according to claim 1 in which Z has at most six carbon atoms if it does not contain an aromatic ring and at most 12 carbon atoms if it does contain an aromatic ring.

4. Polyoxetanes according to claim 2, in which Z, $Z'$ and $Z''$ have at most six carbon atoms if they do not contain an aromatic ring and at most 12 carbon atoms if they do contain an aromatic ring.

5. Polyoxetanes according to claim 1, in which the proportion of nitrogen-containing heterocyclic structures per recurring ether unit is, on average, between 10 and 200 percent.

6. Polyoxetanes according to claim 5 in which the proportion of nitrogen-containing heterocyclic structures per recurring ether unit is, on average, between 20 and 100 percent.

7. Polyoxetanes which comprise recurring units of the formula:

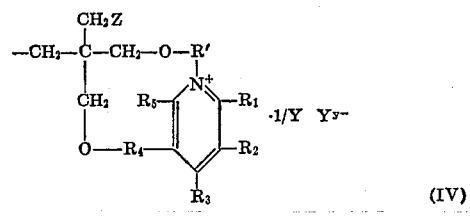

(IV)

or

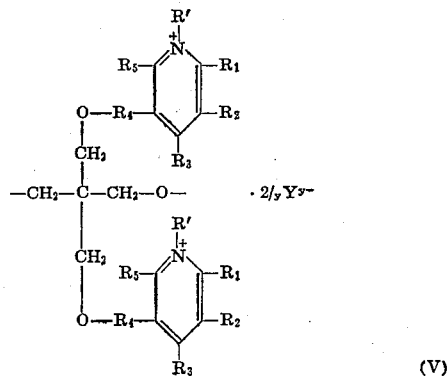

(V)

of formulae (IV) and (V) or formulae (IV) and (V) and units of at least one of formula (I) or formula (II), as defined in claim 1, or formula (III), as defined in claim 2, in which $R_1$, $R_2$, $R_3$, $R_4$ and $R_5$ are as defined in claim 1, R' represents a monovalent or polyvalent organic radical, and $Y^{y-}$ denotes an anion such that $H_yY$ represents water or an inorganic or organic acid, y being a positive integer representing the valency of the ion Y.

8. Polyoxetanes according to claim 7 in which at least 70 percent of the nitrogen-containing heterocyclic structures are quaternised.

9. Polyoxetanes according to claim 7 in which some of the quaternised nitrogen atoms are connected to one another by a polyvalent radical, thus forming cross-links.

10. Polyoxetanes according to claim 9 in which between 10 and 60 percent of the quaternised nitrogen atoms are connected to one another by a polyvalent radical.

11. Polyoxetanes according to claim 1 in the form of membranes.

12. Polyoxetanes according to claim 7 in the form of membranes.

13. Polyoxetanes according to claim 12 in which the membranes are supported by a woven fabric, a grid or a net.

14. In a process involving the use of an ion-exchanger the improvement wherein the ion-exchanger is a membrane as defined in claim 11.

15. In a process involving the use of an ion-exchanger the improvement wherein the ion-exchanger is a membrane as defined in claim 12.

* * * * *